July 16, 1957  D. A. NEGRIN ET AL  2,799,846
FAULT INDICATING SYSTEM
Filed Feb. 24, 1955  2 Sheets-Sheet 1
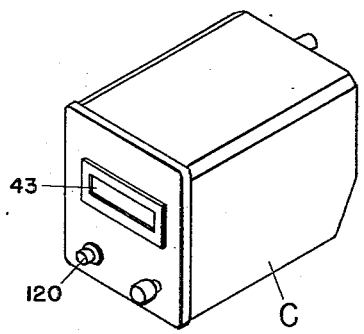
FIG.1
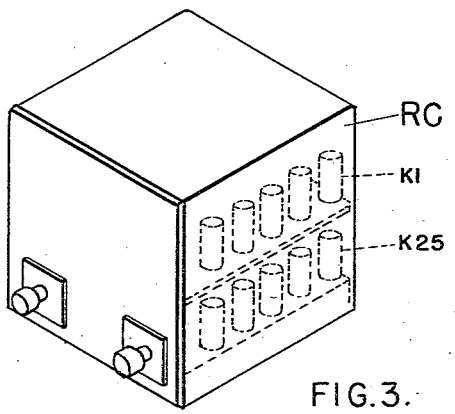
FIG.3.
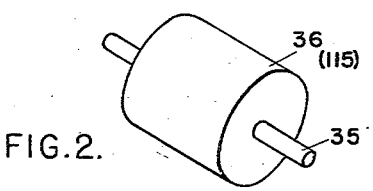
FIG.2.
FIG.4.
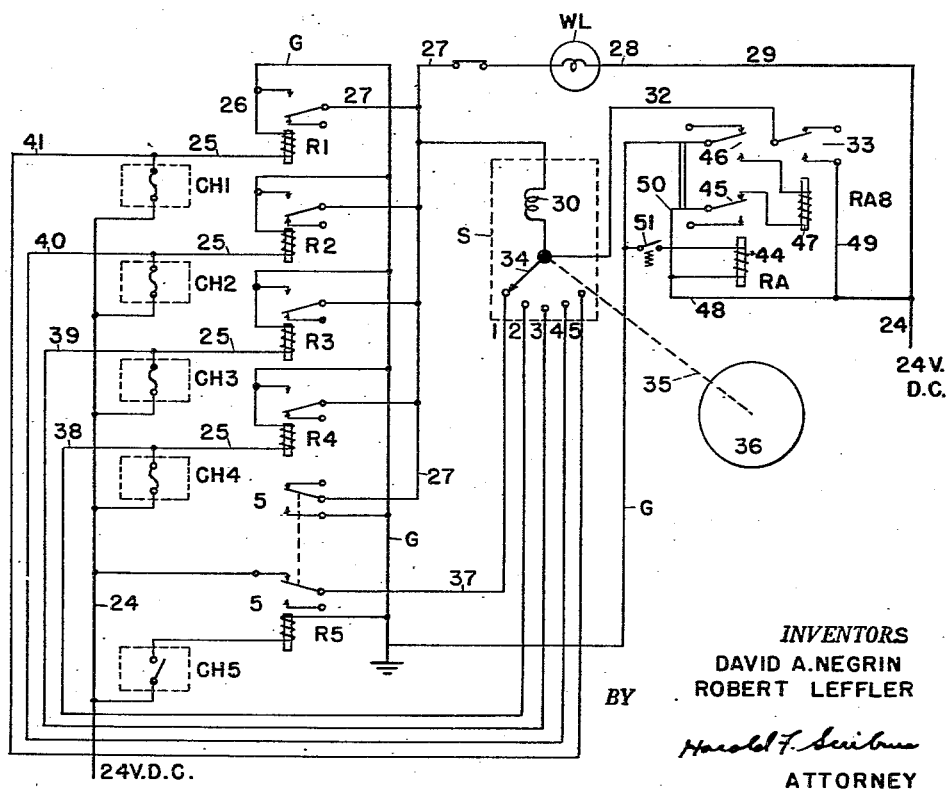
*INVENTORS*
DAVID A. NEGRIN
ROBERT LEFFLER
BY Harold F. Scribner
ATTORNEY

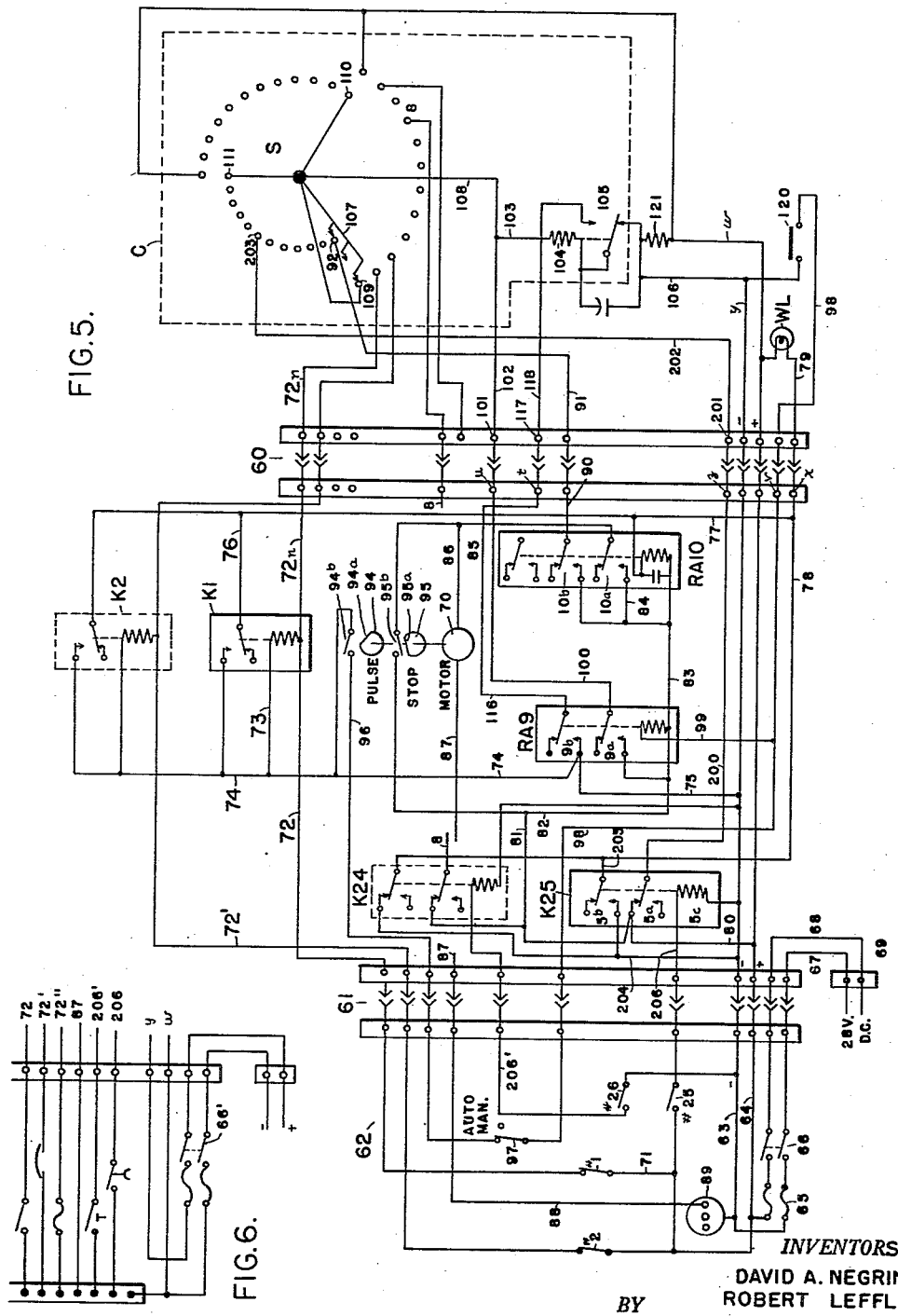

United States Patent Office 2,799,846
Patented July 16, 1957

2,799,846

FAULT INDICATING SYSTEM

David A. Negrin, Fanwood, N. J., and Robert Leffler, Dayton, Ohio

Application February 24, 1955, Serial No. 490,266

7 Claims. (Cl. 340—213)

The present invention relates to safety devices and systems but more particularly to a safety system that functions when a fault arises in any one or more of a plurality of stations, circuits, channels, devices or the like to give warning of the fault and information as to its location or as to what may be appropriate for the condition.

A primary aim of the invention is to relieve an operator, such as a pilot of a plane, of the necessity to repeatedly scan a maze of instruments and dials in preparation for a flight, during the flight and in landing operations to assure readiness of the various units vital to such operations, and to provide the operator with a single master indicator that automatically comes into operation immediately upon the arising of a fault condition to give warning of the fault and its location. However, when all conditions are normal the fault indicating system of the invention is non-operating so that there is no distracting influence upon the operator.

A further aim of the invention is the construction of a fault indicating system or unit that not only eliminates need for the vast groups of dials and gauges, etc. now employed, but which may be compactly assembled and stowed in a relatively small space. By way of additional refinement the invention proposes a construction operative to give immediate indication of a danger condition to which a remotely located device such as a fuse, pressure switch, circuit breaker, etc. may be arranged to respond and to utilize the response of the remotely located device, whether it functions in a positive or negative way, to cause the indicator of this invention to locate and give warning of the fault condition.

Still another aim of the invention is the construction of a fault indicating system that may be constructed to operate on relatively low voltages, be exceptionally versatile and adaptable to various requirements encountered in the field such as the ease of adding or eliminating fault channels, and a device normally automatic but capable of manual operation for checking purposes, and preferably equipped with means operable automatically to indicate a power failure.

In attaining the objectives of the invention it is proposed to utilize a conventional rotary stepping switch having one or more banks of contacts and operatively connect an indicator drum to the shaft thereof so that as the switch-arm of the stepping switch turns in response to current pulses the indicator drum turns. The indicator drum is designed to carry information phase related to the contacts of the stepping switch, and which may be viewed through a window in a suitable cabinet. Means for giving warning of a fault and attracting an operator's eye to the indicator is provided in the form of a light that illuminates the indicated legend so that it may be easily read.

The cabinet containing preferably only the indicator, warning light, and stepping switch is positioned within convenient range of vision of the operator and connected by a suitable cable to another cabinet that contains fault-responsive relays, master relays, and the circuitry that controls the stepping switch. One fault-responsive relay is included for each circuit, channel, system, etc. that is to have an "at fault" condition reported on the master dial or indicator, and there may be as many channels and fault-responsive relays as there are operating contacts on the stepping switch. The system is so designed that when all channels under control of the master indicator are properly functioning, a positive potential exists at the respective contacts of the stepping switch. However, when one or more of the channels break down or takes on a not-normal or dangerous condition one or more contacts at the stepping switch go dead whereupon the master indicator immediately is set in operation, a warning light is flashed, and the particular station or channel at fault comes in registry with the window of the master indicator unit. Additionally, means are provided for initiating a search cycle of the master indicator manually when desired, as well as safety means operative to prevent the passing of a fault condition inadvertently.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings represents an indicating unit that forms part of the present invention.

Fig. 2 is a view of an indicator drum that is rotatably supported within the indicating unit of Fig. 1.

Fig. 3 is a view of the relay cabinet that houses the various control relays of the fault warning system.

Fig. 4 is a line simplified diagram of a representative fault indicating circuit.

Fig. 5 is a line diagram of another fault indicating circuit including a fault simulating circuit useful in testing.

Fig. 6 is a diagram illustrating representative channels in which a fault may arise and which notification of the location of the faulting channel is to be indicated on the master-dial indicator unit of Fig. 1.

Referring more particularly to Fig. 4, the devices marked CH1, CH2, CH3, CH4 and CH5 indicate a number of different circuits or channels that one may desire to have their respective locations indicated on a common dial or indicator when at fault. The devices R1, R2, R3, R4, and R5 are double pole magnetic switches, the coils of which are connected in series with the control devices CH1, CH2, etc. Line 24 on the diagram represents a source of 24 v. D. C. current that may be employed to activate the different circuits. This current supplies channel CH1, for example, here indicated as a fuse, and through line 25 is connected with the coil of relay R1, and thence through line 26 to ground line G. Relay R1 is of the normally closed type and if channel 1 is in order and functioning properly 24 v. D. C. current is supplied to normally open side of relay switch R1. Line marked 27 that leads from the switch arm connects through a manual switch 28 with a warning light WL that also connects via line 29 with the source of 24 v. D. C. current. The warning light WL, therefore, does not glow. However, if channel 1 is out of order and at fault (blown fuse) the current to relay R1 is interrupted, the coil de-energizes and its switch arm is thrown to connect line 27 with ground line G and the light WL glows to give warning that a channel is at fault. For illustrative purposes four channels CH1, CH2, CH3, CH4 have been indicated as fuse controlled and connected to cause the warning light to flash when one of the circuits is open (e.g., blown fuse).

Channel 5 (CH5) exemplifies a circuit in which a switch closes when the circuit is at fault. In such a circuit the coil of relay R5 is deenergized when the circuit is functioning properly. Relay R5, however, operates two switches 5a and 5b in unison. Line 27 from the warning light WL connects with the switch arm of 5b which normally is thrown to its open side. The ground line G connects with the coil of switch 5a. However, when channel 5 is functioning properly the switch in CH5 is open and the coil of relay R5 is deenergized. Should a fault condition exist in CH5, the switch closes, the coil of relay R5 is energized, switch 5b closes on the ground side and the warning light gives the signal.

Inasmuch as there may be quite a few circuits whose fault condition and location should be indicated with a signal light or other warning indicating means that is common to all of the fault circuits the invention further proposes a means for readily determining which of the circuits is at fault. To that end a solenoid operated stepping switch indicated at S in Fig. 4 is provided. The solenoid coil 30 of the stepping switch is connected at one side to line 27 and at its other side to line 32 that connects with the open side of a switch 33 in a pulsing circuit and as long as the switch 33 remains open the stepping switch coil 30 is deenergized.

The stepping switch S includes a rotatable contact arm 34, adapted to sweep a number of contacts 1, 2, 3, 4, and 5, and an armature shaft 35 upon which an indicator drum 36 is mounted. Contact 1 is connected by line 37 to the switch arm of switch 5a which is normally closed on its 24 v. D. C. side (line 24). However, under normal conditions solenoid 30 of the stepping switch S remains deenergized by virtue of the fact that line 27 is not connected with ground at any of the relays R1–R5. Contacts 2, 3, 4, and 5 are connected by lines 38, 39, 40, and 41 with the channel circuits CH4, CH3, CH2, CH1 and as long as these circuits and the devices they represent are functioning properly, a potential of 24 v. D. C. exists at every contact point 1, 2, 3, 4, 5 of the stepping switch S.

When a fault exists, for example, in channel 3 (CH3) the relay switch R3 moves from its open side to its ground side G and completes a circuit through line 27 to the stepping switch solenoid 30, contact arm 34, line 37, switch 5a, to line 24 (24 v. D. C.), thus causing the stepping switch to move from contact 1 to contact 2. Contact 2 carries a potential of 24 v. D. C. because channel CH4 is functioning properly, hence the switch arm continues moving to contact 3. Contact 3 connects by line 39 to the circuit CH3 and since this circuit in this example contains a fault (blown fuse) line 39 is dead and there will be no current at contact 3 and the stepping switch will stop at that point. Armature shaft 35 and the indicator drum 36 revolve with the switch arm of the stepping switch, and as the indicator drum will carry appropriate legends or other indicia identifying the several channel circuits, the name of the particular channel at fault will be visible through the window 43 of the indicating unit depicted in Fig. 1.

The conventional solenoid-operated stepping switch 5 requires a pulsing circuit to supply successive energizing pulses to the solenoid coil 30. Such a circuit is indicated in Fig. 4 and includes a make-before-break relay RA and a conventional relay RA8. Relay RA comprises a coil 44 and two switches 45 and 46 operated thereby, whereas, relay R8 includes coil 47 and switch 33 operated thereby. One side of coil 44 of relay RA and the normally open side of switch 33 of relay R8 is connected with a source of 24 v. D. C. current as by lines 48 and 49. A line 50 which also carries 24 v. D. C. is connected with the switch arm of switch 45. The other side of the relay coil 44 is connected to ground G through a spring opened switch 51. When the switch 51 is closed solenoid coil 44 becomes energized and switches 45 and 46 are actuated. The coil 47 of relay R8 is connected to the normally closed side of switch 45 (to receive 24 v. D. C.) and to the normally open side of switch 46. Switch 46 is actuated before switch 45, and closes on its ground side (G) and completes a circuit to relay coil 47 of relay R8. Immediately thereafter, however, switch 45 moves to its open side interrupting the current to the coil 47. The momentary energization of coil 47 is sufficient to operate switch 33 to its closed position whereupon 24 v. D. C. is supplied through line 49, switch 33, and line 32 to coil 30 of the stepping switch. Hence, when a fault exists in one of the controlled channels, the stepping switch begins to function and to revolve the indicator drum until the particular contact that is associated with the faulty channel is reached. At this point the indicator will stop and the name or location of device at fault will be indicated in the window 43. Should the operator not regard that particular fault to be serious, or if he wishes to check for possible additional faults, he may press switch 51 to energize relay RA whereupon switches 46 and 45 are actuated in sequence as above explained to give an additional pulse to the stepping switch so as to remove its contact arm 34 from the fault terminal (3 in this example). Thereafter, the stepping switch will continue to move from contact to contact and revolve the indicator drum until another "dead" contact is reached. Should there be no other circuit at fault, the stepping switch will make a complete sweep and stop at the "dead" contact as before.

The fault indicating system illustrated in Fig. 5 is an elaboration of the system of Fig. 4. The master-indicator unit is represented in dotted line C and includes a stepping switch having three banks of contacts, namely, inner, middle, and outer. Each bank comprises a plurality of active contacts that are connected in consecutive order to a jack plug 60. In the drawing all lead wires are spread out for clarity, but it will be understood that in practice it may be convenient to group the leads into cable form.

The relay cabinet RC (Fig. 3) contains the various relays and in addition a variable-speed pulsing motor by which starting pulses may be given to the stepping switch. The cabinet RC may be fitted with the complementary part of the jack plug 60, and also a similar jack plug 61 by which a testing circuit or fault simulator system 62 may be plugged in. In this system lines y and w and their related terminals represent the negative and positive sides of a source of current, for example 28 v. D. C. When the fault simulator 62 is plugged in, lines y and w receive power through lines 63, 64, a pair of fuses 65, double pole switch 66, plug 61, lines 64, 68, and terminal bar 69.

The cabinet RC is designed to contain in compact arrangement a plurality of relays K1, and a plurality of relays K25, the former being comparable in operation to relay R1, of Fig. 4, and the latter comparable in operation to relay R5 of Fig. 4. All K1 type relays (see K2 shown in dotted outline in Fig. 5) are connected as the K1 relay indicated in Fig. 5, and all K25 relays (see K24 in dotted outline) are connected as the K25 relay indicated in Fig. 5. In addition, the relay cabinet includes relay switches RA9 and RA10, and a variable speed motor 70.

The fault simulator system 62 is not a part of the indicator unit but useful in testing and is illustrated for clarity. A representative field system is illustrated in part in Fig. 6. The simulator system may, however, include a plurality of normally closed circuits indicated symbolically #1, #2, etc., and a plurality of normally open circuits indicated symbolically as #25, #26, etc., each in a circuit associated with the several relays K1 and K25, respectively. When a switch such as #1 is closed, a circuit from the positive line w is completed through line 68, switch 66, fuse 65, line 64, line 71, switch #1, line 72, to the coil of relay K1, thence via line 73, line 74, and line 75 to the negative side y. Relay K1 is thus energized and its switch is in open position. Should a fault exist in the device to which switch #1 responds, relay K1 will be deenergized and the switch therein will close on its ground or negative side (line 74), thus connecting ground line 74 to line 76 (of the switch arm) which leads via lines 77 and 78 to terminal x of the plug 60. A corresponding line 79 leads to a warning light WL that is connected on its other side with the positive side w of the circuit, and a warning signal is given.

When line 78 becomes ground through relay K1, a circuit to the solenoid coil of relay RA10 is completed, and its lower switch 10a closes on its positive side which completes a circuit to a pulse motor 70 as follows: from positive line +w, through lines 80, 81, 82, 83, 84, switch 10a of RA10 (which will be closed), lines 85 and 86 to motor 70, and the return through lines 87, 88 to rheostat 89 to the negative line 63 (y). Also, when relay RA10 is energized, due to a fault, the upper switch 10b closes on the positive side (line 83 now positive) and positive potential exists via lines 90, 91 in the last terminal 92 of the outer bank of the stepping switch C.

When the motor starts operating, a pulse cam 94 and stop cam 95 on the shaft of motor 70 revolve at a selected rate that will be determined on location. Cam 94 is formed with a flattened portion 94a designed to actuate a microswitch 94b intermittently. When the switch 94b is closed, a circuit is made from negative line 74, through switch 94b, line 96, plug 61, Auto switch 97, again through plug 61, lines 98 and 99 to the coil of relay RA9. Energization of relay RA9 effects closing of switch 9a on its positive side (line 82), and a positive pulse is passed through line 100, terminal u and corresponding terminal 101 of the plug 60 to lines 102 and 103, and to coil 104 of the stepping switch C. Energization of the coil 104 loads a spring which advances the stepping switch on deenergization of the coil 104. Coil 104 of the stepping switch is momentarily grounded through its relay-operated switch 105 to line 106 and ground line y. However, when the current pulse given to the coil 104 is interrupted the ratchet mechanism of the switch functions to advance the switch arm 107. Relay switch 105, however, repeatedly opens and closes in response to switch arm 107 reaching positive contacts and ceases to function when the arm 107 of the stepping switch arrives at a contact that shows absence of positive potential indicative of a fault.

The positive-pulse current in lines 102, 103 is supplied through line 108 to the end terminals 109, 110, 111 of the three banks of contacts of the stepping switch, these terminals are not normally connected to a channel for fault indicating. In the position of the switch arm 107 shown in Fig. 5, contact 92 of the stepping switch is positive only when a fault exists such as would actuate relay RA10. Positive potential at the contact is necessary to insure that the stepping switch will start and pass that contact in searching for fault conditions. The leading contact 109 of the inner bank of contacts is also positive when a fault exists, but the next contact in the inner bank, proceeding counterclockwise is positive when the channel it represents (K1 and typical switch #1 in this instance) is functioning normally. If channel K1 and switch #1 is out-of-order line 72n connected with the said next contact past 109 of the stepping switch, becomes dead and the switch arm 107 stops at that point. The indicator drum 115 which is driven from the stepping switch will also stop and the name of the channel at fault will be in registry with the window 43 in the indicator unit for observation.

As above explained, when a fault exists in any channel of which switch #1 is representative, relay K1 operates to connect line 76, 77 with ground line 74 thus energizing relay RA10 to start the pulse motor 70 operating. When switch 94b operated by the pulse cam 94 closes, lines 96, 97, 98 and 99 become connected with ground line 74 and relay RA9 functions to close switch 9a and connect lines 100 and lines 103 and 108 of the stepping switch with positive lines 82. In addition switch 9b of RA9 closes which connects ground lines 74 y to the other side of the stepping-switch relay switch 105, through lines 116, plug terminals t 117, and line 118. Thus both sides of switch 105 is grounded when a fault exists and accordingly while switch 94b is on the flat 94a of pulse cam 94 line 103 is positive and coil 104 is energized once which will open relay switch 105 on its normally grounded side 106 and close it on its other grounded side (line 118). Hence the stepping-switch coil 104 does not deenergize itself to advance the contact arm 107 until the pulse cam 94 opens pulse switch 94b. For continued stepping operations therefor the positive potential necessary to energize relay coil 104 of the stepping switch must be derived from the stepping switch itself through its wiper arm 107 and line 108. As long as the wiper arm 107 continues to make contact with positive contacts (conditions in the associated channels operating normally) the solenoid 104 will receive positive energy which will be interrupted intermittently by relay switch 105. And when the contact is reached that is dead (no longer the normal positive) the solenoid 104 ceases to function and the stepping switch stops at that point, likewise the indicator drum 115. The warning light WL will be on, calling attention that a fault exists, and the location of the fault will appear on the drum.

Should the operator regard the indicated channel as not too serious a fault and he desires to pass on to determine if any other channels are at fault, means are provided to initiate a recycle, i. e., to cause the stepping switch to skip the first found fault and continue the search for the next fault. If no second fault exists the stepping switch will again stop at the first fault position.

The recycling means comprises a push button switch 120 located preferably on the indicator cabinet C. Switch 120 is connected across normally-negative line y and intermittently negative line 98 leading to line 99 to relay RA9. Ordinarily relay RA9 is actuated by the closing of pulse switch 94b and when the motor is not running pulse switch 94b is open. A similar current pulse may be given to relay RA9 through the manual switch 120 whereby to effect closing of switches 9a and 9b and move the wiper arm 107 off the dead contact. Here also stepping-switch solenoid 104 fails to become energized more than once due to the action of its grounding switch 105, unless or until the operator releases button 120. In this way a safety is provided that guards gainst holding switch 120 pressed too long and eliminates the possibility of missing or skipping of one or more fault positions immediately following.

A further safety feature resides in the provision of continuously operating means that will give visible evidence that the system is operative. One form of such a device may be a signal flag that may be arranged, for example, to cover the window of the indicator when there is a power failure. To operate such a signal a solenoid 121 may be connected across lines y and w in the indicator cabinet and which is normally energized when power is in the circuit to hold the flag or other signal out of view or operation. When there is a power failure, solenoid 121 becomes deenergized and the flag comes into view to blank out the indicator or give other appropriate warning that the fault detecting system itself is out of order.

Now when the fault that caused relay RA10 to operate to close switch 10a and start pulse motor 70, and relay RA9 to transmit the starting pulse to the stepping-switch relay, is corrected relay RA10 would open switch 10 and the motor 70 normally would stop. However, stopping of the pulse motor at a random position is not desirable and means have been embodied in the form of stop cam 95 and switch 95b actuated thereby to effect stopping of the motor with the pulse switch 94b open. Switch 95b is connected across positive potential line 82 and the positive-when-fault line 85. Stop cam 95 is formed with a flattened portion 95a operative at a certain point in its rotation to allow switch 95b to open and stop the motor. The flats on pulse cam 94 and stop cam 95 are so related that the motor will stop with pulse switch 94b open and just before the pulse switch closes so that there is no appreciable lag in pulsing the stepping switch when a succeeding fault occurs. Whenever a fault exists the motor is operating, when the fault has been corrected, the motor runs until stopped by opening of the stop switch 95b. Pulse switch 94b will also be open when the motor stops thus deenergizing relay RA9.

Relay K25 is representative of a number of relays that may be installed in the relay cabinet to respond to channels that in turn are at fault when a switch or a circuit closes. (Relay K1 represents a relay that responds when a switch or a circuit in its associated channel opens.) Relay K25 embodies two switches 5a and 5b, the former being normally closed (relay solenoid deenergized) on its positive side and switch 5b normally in open position. A line 200 connects the switch arm of switch 5a with terminal z and 201 of the plug 60, and line 201 therefrom connects with one of the terminals 203 (for example) of the stepping switch. Thus, when the associated relay K25 is deenergized, positive potential is supplied at its contact 203 of the stepping switch. The positive side of switch 5a is connected with line 80 and the positive line +w. The negative side of the other switch 5b of the relay connects by line 204 to the ground line —y, and the switch arm of switch 5b connects by line 205 to the negative-when-fault line 78, the latter being connected to the solenoid of relay RA10. Hence, when the coil 5c of relay K25 is energized, switch 5a opens and the related contact 203 at the stepping switch is dead, also switch 5b of the relay closes on its ground side thereby energizing relay RA10 and lighting warning light WL. Relay RA10, as above explained, starts the pulse motor 70, whereupon pulse switch 94b closes and energizes relay RA9 (through lines 96—99), and a starting pulse of positive current is passed to the stepping switch through lines 100—103, 108.

The relay coil 5c of the relay K25 is connected at one side permanently to the negative or ground line y, and on its other side by line 206 to a normally open circuit represented by switch #25 and the latter to a source of positive potential in line 64, +w. Thus, when the channel that dominates switch #25 is functioning normally, switch #25 remains open, and the corresponding contact on the stepping switch shows positive. When, however, the channel or circuit that dominates switch #25 is at fault the switch #25 closes to energize its associated relay K25 and then responds (a) to render its contact 203 at the stepping switch dead, (b) to energize motor-starting relay RA10, and (c) to cause relay RA9 to function and transmit a starting pulse to the stepping switch C. When such a fault occurs the stepping-switch arm 107 begins to sweep the contacts and when the dead contact is reached, stops at that point and its location will be indicated on the indicator drum 115. It will be understood that all other portions of the circuitry previously explained in connection with relay K1 and switch #1 operate or are operable in the same manner with relay K25 and switch #25.

For the purpose of rendering the pulsing circuit selectively automatically operative or solely manually operative an auto-man. switch 97 is inserted in the fault simulator circuitry. To enable one to open both sides of the power circuit at will, for example, to test the operation of the flag solenoid, to install or remove one or more K1 or K25 relays, a knife switch 66 is inserted in the simulator circuitry.

It will be understood that all relays of the K1 type are connected like relay K1, and all relays of the K25 type are connected like relay K25 to the terminals A, B, C, etc. of the plugs 60 and 61 in consecutive order and, likewise, the contact points of the stepping switch are connected in correspondence to the plug terminals.

In the present disclosure a stepping switch having 30 available fault indicating positions has been illustrated and provision made in the relay cabinet RC to accommodate up to 30 fault-responsive relays of either the positive-fault type or the negative-fault type. The number of fault positions may, of course, be increased or decreased according to the conditions or circumstances under which an indicating device of this type is to be used. It will thus be seen that a most important feature of this invention resides in the conception and compact arrangement of circuitry that will cause a single dial or indicator accurately to give indication of the particular external channel or circuit that may be at fault. By this invention a pilot of a plane, for example, may quickly survey his entire panel board by pressing a single button (120) and without looking at numerous other dials and gauges instantly obtain critical information, should any of his controls, circuits, engines, running gear, etc., be out-of-order.

Fig. 6 illustrates diagrammatically portions of circuitry corresponding to a number of channels in which a when-at-fault signal should be given and the location thereof indicated on the dial of indicator cabinet C. The various symbols illustrated, namely, an open switch, circuit breaker, fuse, temperature switch, pressure switch being representative of circuits that open or close when fault occurs, and each is connected to its proper K1-type or K25-type relay and the latter with master relays RA9 and RA10 and with their respective contacts of the stepping switch S. The indicating drum 36 (115) will, of course, be marked with identifying legends about its periphery that correspond with the respective channels and properly phased with the position of the contacts on the stepping switch. A preferred construction of the indicator drum is that it shall be translucent or reflective so that the warning light may be placed at the rear thereof and thus not only illuminate the drum at the window 43 when a fault condition exists but give the location thereof, and/or such other information or instructions as may be suited for the condition.

Thus it will be seen that a fault indicating system constructed along the lines explained eliminates the need of a vast number of dials, indicators, and warning lights, etc. heretofore found necessary. The operator is furthermore relieved of the stress of scanning an entire panel and of the distraction of numerous warning devices. The present system employs a single master indicator to which reference may be had for fault indication in any one of a large number of channels, stations or circuits. The device is normally automatic in its functioning of locating faults but should the operator desire to make a quick recheck of the various stations he may press the cycle switch and cause the stepping switch to make a search. If there is no fault condition in any circuit there is no warning light and the indicator stops at its zero position. The units may be compactly organized as, for example, the relay cabinet RC need only be about the size of an 8-inch cube, and stowed in small out-of-the-way space and connected by cable to the indicator unit, and the indicator unit need be no larger than a 6-inch cube and located at the most convenient place for the observer.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:

1. A fault finding system for detecting the existence of a fault in any one of a multiplicity of monitored circuits comprising a stepping switch having a plurality of contacts adapted to be swept by its wiper arm, each of said contacts being operatively connected with one of the circuits to be monitored and normally receiving positive potential therefrom under normal conditions, an indicator element connected with and driven by said wiper arm in phase relation, said drum carrying indicia markings corresponding to the monitored circuits, a master relay switch common to all of said monitored circuits and responsive thereto for supplying positive potential to the stepping switch when any one or more of the monitored circuits reflects a failed condition thereby to start the stepping switch cycle, a signal light connected in parallel with said master relay operative to give a visual signal on failure of any one monitored circuit, said stepping switch continuing its stepping cycle until the contact thereof associated with the at-fault circuit is reached whereupon stepping operations cease with the at-fault circuit visible on the indicator at the stopped position.

2. The combination of claim 1 including means to restart the stepping operation of the stepping switch a predetermined time following the stopping thereof at the first-reached at-fault contact so that other at-fault contacts may be searched out and similarly registered on the indicator element in addition to the visual light signal.

3. A fault indicating means for use in detecting and indicating the existence of a fault condition in any one of a plurality of monitored channels combining, rotary switch means having a switch arm and a plurality of contacts positioned to be successively swept by the switch arm, an indicator connected with and driven by said switch arm, said indicator having indicia markings identifying the respective channels and phase related with the contacts of the rotary switch, a pulsing circuit for actuating the arm of said switch over said contacts, said pulsing circuit being connected to the said switch arm and normally to receive motivating current pulses through the respective switch contacts engaged thereby, a relay operatively connected with each of the channels to be monitored and effective normally to supply motivating current to its related contact of the rotary switch and operative upon the arising of a fault condition in its related channel to interrupt the supply of motivating current to its related switch contact, means to initiate a current pulse in said pulsing circuit so as to start stepping operations of the rotary switch, said stepping operations continuing by virtue of current pulses received through the contacts and switch arm of the rotary switch until the contact thereof related to the channel at fault is reached whereupon stepping operations cease with the at fault channel identified on the indicator.

4. The combination of claim 3 in which the means to initiate a current pulse in the said pulsing circuit is responsive to actuation of any of the relays in the monitored channels to the arising of an at fault condition therein.

5. A fault warning indicator for use in detecting and indicating the existence of a fault condition in any one of a plurality of monitored channels, combining a rotary stepping switch having a plurality of contacts adapted to be swept by its switch arm, an indicator connected to and driven by said switch arm, said indicator having indicia markings identifying the respective channels, a pulsing circuit including said contacts for said stepping switch, means operatively connected with each channel to be monitored and operatively responsive to a fault condition arising therein to render the pulsing circuit operative whereby to start the sweep of the switch arm of the stepping switch over the said contacts, a connection from each of said means to a related contact of the stepping switch operative in the absence of a fault condition in its associated channel to supply motivating current to that contact, each of said means being operative when a fault arises in its associated channel to open the circuit to its related contact of the stepping switch whereby the sweep of the switch arm thereof comes to rest at the contact having the open circuit, and a normally open switch in said pulsing circuit of the stepping switch, cam means for actuating said normally-open switch to closed position, a normally de-energized motor connected to actuate said cam, and means rendering said motor operative to effect a recycling of said stepping switch subsequent to its stopping at the contact having the open circuit.

6. A device of the character described combining an indicator unit adopted to respond step-by-step to current pulses and to cease responding when the current is interrupted at one of the steps, a bank of monitoring relay units and a master relay, each of said monitoring relays being operatively connected at one of the steps of the indicator unit and adapted normally to supply current thereto, a current source, connections between said current source and each of said monitoring relays including switch means responsive to a failure of current in said last-named connections to open the circuit to the related step of the indicator unit, and connections between said monitoring relays and said master relay operative upon said failure of current in any of said connections to actuate said master relay, and connections from the master relay to said indicator unit operative on actuation of the master relay to effect the closing of a starting circuit to the indicator unit whereby the latter functions step-by-step until a step whose circuit has been interrupted is reached, and an electric motor energized by said master relay, a cam driven by said motor, and switch means operative by the cam to impart a starting pulse to said stepping switch whereby to cause the latter to continue stepping operations until another step whose circuit has been interrupted is reached.

7. The combination of claim 6 including a second motor-driven cam and other switch means adapted to be actuated thereby, said other switch means forming part of a holding circuit across said master relay operative to maintain the motor-driven cams in operation for a predetermined interval subsequent to de-energization of the master relay upon correction of the fault.

References Cited in the file of this patent
UNITED STATES PATENTS

| | | |
|---|---|---|
| 1,708,430 | Perdue | Apr. 9, 1929 |
| 2,449,304 | Lamb | Sept. 14, 1948 |
| 2,506,394 | Strange | May 2, 1950 |
| 2,547,011 | Jacobsen | Apr. 3, 1951 |